(12) United States Patent
Fan (10) Patent No.: US 11,209,340 B2
(45) Date of Patent: *Dec. 28, 2021

(54) ROTARY MICROTOME AND CONTROL METHOD FOR THE SAME (71) Applicant: Leica Microsystems Ltd., Shanghai, Shanghai (CN)

(72) Inventor: Zheguang Fan, Shanghai (CN)

(73) Assignee: LEICA MICROSYSTEMS LTD., SHANGHAI, Shanghai (CN)

( * ) Notice: Subject to any disclaimer, the term of this patent is extended or adjusted under 35 U.S.C. 154(b) by 223 days.

This patent is subject to a terminal disclaimer.

(21) Appl. No.: 16/626,182

(22) PCT Filed: Sep. 26, 2018

(86) PCT No.: PCT/CN2018/107564
§ 371 (c)(1),
(2) Date: Dec. 23, 2019

(87) PCT Pub. No.: WO2019/072086
PCT Pub. Date: Apr. 18, 2019

(65) Prior Publication Data
US 2020/0217758 A1    Jul. 9, 2020

(30) Foreign Application Priority Data

Oct. 11, 2017   (CN) .......................... 201710942847.5

(51) Int. Cl.
*G01N 1/06* (2006.01)
*G01N 1/28* (2006.01)
*G05B 19/042* (2006.01)

(52) U.S. Cl.
CPC ............... *G01N 1/06* (2013.01); *G01N 1/286* (2013.01); *G05B 19/0423* (2013.01);
(Continued)

(58) Field of Classification Search
CPC .... G01N 1/06; G01N 1/286; G01N 2001/065; G01N 2001/2873; G01N 1/42;
(Continued)

(56) References Cited

U.S. PATENT DOCUMENTS 3,691,889 A * 9/1972 Forsstrom ................ G01N 1/06
                                                           83/707
3,828,641 A * 8/1974 Sitte .......................... G01N 1/06
                                                           83/703
(Continued)

FOREIGN PATENT DOCUMENTS

CN    104833541 A    8/2015
CN    205562247 U    9/2016

*Primary Examiner* — Ghassem Alie
(74) *Attorney, Agent, or Firm* — Hodgson Russ LLP (57) ABSTRACT A rotary microtome and a control method therefore are provided. The rotary microtome includes: a specimen holder, configured to hold a specimen; a handwheel drive system, including a handwheel and a handwheel axis, and configured to receive a user operation via the handwheel and to move the specimen holder up and down via the handwheel axis based on the user operation; a damping component, connected to the handwheel axis, and configured to generate damping for rotation of the handwheel axis; a knife; a section motor, connected to the knife and configured to drive (Continued)

the knife to cut the specimen; and a control device, connected to the damping component and the section motor respectively, and configured to obtain an operation parameter of the section motor, and to adjust the damping generated by the damping component according to the operation parameter, such that the user feels a material hardness of the specimen.

14 Claims, 3 Drawing Sheets

(52) U.S. Cl.
CPC .................. *G01N 2001/065* (2013.01); *G01N 2001/2873* (2013.01); *G05B 2219/2214* (2013.01)
(58) Field of Classification Search
CPC ...... G01N 2001/068; G05B 2219/2214; G05B 19/0423; B26D 1/105; B26D 1/00; B26D 1/1575; B26D 5/08; B26D 5/086; B26D 7/24; G01B 2001/066; Y10T 83/6571; Y10T 83/283; Y10T 83/6508; Y10T 83/6492; Y10T 83/6445; Y10T 83/18
USPC ........ 83/13, 400, 409, 403.1, 167, 713, 417, 83/703, 410, 915.5, 412, 414, 714, 734, 83/563, 564, 426, 168, 169, 701, 72, 83/76.9, 68, 915.3, 733, 416, 399; 700/275

See application file for complete search history.

(56) References Cited

U.S. PATENT DOCUMENTS

| | | | | |
|---|---|---|---|---|
| 4,505,175 | A * | 3/1985 | Reichel | G01N 1/06 83/564 |
| 6,598,507 | B1 * | 7/2003 | Gunther | B26D 5/08 83/703 |
| 8,347,769 | B2 * | 1/2013 | Walter | G01N 1/06 83/13 |
| 2009/0165627 | A1 * | 7/2009 | Walter | G01N 1/06 83/713 |
| 2010/0180742 | A1 * | 7/2010 | Walter | G01N 1/06 83/399 |
| 2013/0166072 | A1 * | 6/2013 | Yang | G01N 1/06 700/275 |
| 2013/0186248 | A1 * | 7/2013 | Heid | G01N 1/06 83/530 |
| 2014/0026728 | A1 | 1/2014 | Walter | |
| 2017/0115189 | A1 * | 4/2017 | Heid | G01N 1/06 |
| 2020/0116597 | A1 * | 4/2020 | Fan | G01N 1/06 |
| 2020/0124502 | A1 * | 4/2020 | Fan | G01N 1/06 |

* cited by examiner

ROTARY MICROTOME AND CONTROL METHOD FOR THE SAME

CROSS-REFERENCE TO RELATED APPLICATIONS

This application is a U.S. national phase application of International Application No. PCT/CN2018/107564, filed Sep. 26, 2018, which claims priority of Chinese Application No. 201710942847.5, filed Oct. 11, 2017, the entire contents of which are incorporated herein by reference.

FIELD

The present disclosure relates to a technology field of cutting the specimen, and more particularly to a rotary microtome and a control method for the rotary microtome.

BACKGROUND

A rotary microtome generally includes an object carriage. The object carriage carries a specimen holder that holds a specimen to be cut. The object carriage is moved up and down in a vertical path on the rotary microtome. During the vertical movement, the specimen is passed over a knife fixedly arranged on the rotary microtome.

In the related art, the microtome produces thin sections, in which the cutting operation is performed by way of a relative movement between a cutting knife and the specimen. A drive system having a drive motor, a control circuit and a handwheel is provided to generate the relative movement. The handwheel is connected to an encoder that delivers corresponding signals to the control circuit upon rotation of the handwheel. The drive motor is then activated according to the said control circuit.

However, when cutting hard material for which the cutting needs much force, since the handwheel is not connected directly with the specimen, the user cannot feel the material is hard. Similarly, if the material is soft, the user also cannot feel it is soft. Therefore, the cutting operation cannot be performed better.

SUMMARY

The present disclosure aims to solve at least one of problems in the related art to at least some extent.

Accordingly, a first objective of the present disclosure is to provide a rotary microtome, which may help the user feel material hardness of the specimen, thus better performing cutting operation.

A second objective of the present disclosure is to provide a control method for a rotary microtome.

In order to achieve above objectives, embodiments of the first aspect of the present disclosure provide a rotary microtome. The rotary microtome includes: a specimen holder, configured to hold a specimen to be cut; a handwheel drive system, including a handwheel and a handwheel axis connected to the handwheel, and configured to receive a user operation via the handwheel and to move the specimen holder up and down via the handwheel axis based on the user operation; a damping component, connected to the handwheel axis, and configured to generate damping for rotation of the handwheel axis; a knife; a section motor, connected to the knife and configured to drive the knife to cut the specimen; and a control device, connected to the damping component and the section motor respectively, and configured to obtain an operation parameter of the section motor, and to adjust the damping generated by the damping component according to the operation parameter, such that the user feels a material hardness of the specimen.

With the rotary microtome according to embodiments of the present disclosure, the damping generated by the damping component and transported to the handwheel is adjusted according to operation parameter of the section motor, such that the user can feel the material hardness of the specimen, thus ensuring a better cutting operation.

In an embodiment of the present disclosure, the damping component includes: a movable iron, provided on the handwheel axis and configured to move with the handwheel axis; a fixed iron, in which a coil is around the fixed iron, and when an electrical current is applied to the coil, the fixed iron and the coil compromise an electrical magnet, and the moveable iron is attracted to the fixed iron; and an elastic element, disposed between the movable iron and the fixed iron, in which when the moveable iron is attracted to the fixed iron, the elastic element is compressed to generate the damping.

In an embodiment of the present disclosure, the control device is configured to adjust the damping by adjusting the electrical current applied to the coil.

By adjusting the electrical current applied to the coil, the attractive force between the movable iron and the fixed iron varies, such that the elastic element is compressed differently, and thus the generated damping is adjusted.

In an embodiment of the present disclosure, the control device includes: a main controller, configured to obtain the operation parameter of the section motor, and to generate an adjusting instruction according to the operation parameter; and a damping controller, configured to receive the adjusting instruction, and to adjust the electrical current applied to the coil according to the adjusting instruction.

In an embodiment of the present disclosure, the control device further includes an electrical current detector. The electrical current detector is configured to detect an electrical current of the section motor in real time. The main controller is configured to obtain the electrical current detected by the electrical current detector, and to generate the adjusting instruction according to the electrical current.

In an embodiment of the present disclosure, the electrical current is in direct proportion to the damping generated by the damping component.

If the electrical current is increasing, it shows the knife contacts some hard sample, and the damping component will increase the damping of the handwheel, which helps the user feel that the material is hard. If the electrical current is decreasing, it shows the knife contacts some soft sample or no sample (the way back to the start/home position), and the damping component will decrease the damping of the handwheel, which helps the user feel that the material is soft.

In another embodiment of the present disclosure, the control device further includes: a first encoder, connected to the handwheel axis, and configured to detect a rotation angle of the handwheel; and a second encoder, configured to detect a rotation angle of the section motor. The main controller is connected to the first encoder and the second encoder respectively, and configured to compare the rotation angle of the handwheel with the rotation angle of the section motor, and determine whether to adjust the electrical current applied to the coil according to a comparison result.

In another embodiment of the present disclosure, the main controller is configured to: instruct the damping controller to keep the electrical current applied to the coil unchanged when the rotation angle of the handwheel is equal to the rotation angle of the section motor; instruct the damping controller to increase the electrical current applied to the coil when the rotation angle of the handwheel is bigger than the rotation angle of the section motor; and instruct the damping controller to decrease the electrical current applied to the coil when the rotation angle of the handwheel is less than the rotation angle of the section motor.

When the angle of the section motor is less than the angle of the handwheel, the damping controller makes the damping of the damping component increase. This makes the handwheel harder to rotate, and help the user feel that the specimen is hard to cut. When the angle of the section motor is bigger than the angle of the handwheel, the damping controller makes the damping of the damping component decrease. This makes the handwheel easier to rotate, and help the user feel that the specimen is soft to cut.

In order to achieve the above objectives, embodiments of the second aspect of the present disclosure provide a control method for the rotary microtome according to embodiment of the first aspect of the present disclosure. The control method includes: obtaining an operation parameter of the section motor; and adjusting the damping generated by the damping component according to the operation parameter, such that the user feels the material hardness of the specimen through the handwheel.

With the control method of the present disclosure, the damping generated by the damping component and transported to the handwheel is adjusted according to operation parameter of the section motor, such that the user can feel the material hardness of the specimen, thus ensuring a better cutting operation.

In an embodiment of the present disclosure, adjusting the damping generated by the damping component according to the operation parameter includes: generating an adjusting instruction according to the operation parameter; and adjusting the electrical current applied to the coil according to the adjusting instruction, so as to adjust the damping generated by the damping component.

In an embodiment of the present disclosure, generating an adjusting instruction according to the operation parameter includes: detecting an electrical current of the section motor in real time; and generating the adjusting instruction according to the electrical current.

In an embodiment of the present disclosure, the electrical current is in direct proportion to the damping generated by the damping component.

If the electrical current is increasing, it shows the knife contacts some hard sample, and the damping component will increase the damping of the handwheel, which helps the user feel that the material is hard. If the electrical current is decreasing, it shows the knife contacts some soft sample or no sample (the way back to the start/home position), and the damping component will decrease the damping of the handwheel, which helps the user feel that the material is soft.

In another embodiment of the present disclosure, adjusting the damping generated by the damping component according to the operation parameter includes: detecting a rotation angle of the handwheel and a rotation angle of the section motor; comparing the rotation angle of the handwheel with the rotation angle of the section motor to obtain a comparison result; and adjusting the electrical current applied to the coil according to the comparison result, so as to adjust the damping generated by the damping component.

In another embodiment of the present disclosure, adjusting the electrical current applied to the coil according to the comparison result includes: keeping the electrical current applied to the coil unchanged when the rotation angle of the handwheel is equal to the rotation angle of the section motor; increasing the electrical current applied to the coil when the rotation angle of the handwheel is bigger than the rotation angle of the section motor; and decreasing the electrical current applied to the coil when the rotation angle of the handwheel is less than the rotation angle of the section motor.

When the angle of the section motor is less than the angle of the handwheel, the damping controller makes the damping of the damping component increase. This makes the handwheel harder to rotate, and help the user feel that the specimen is hard to cut. When the angle of the section motor is bigger than the angle of the handwheel, the damping controller makes the damping of the damping component decrease. This makes the handwheel easier to rotate, and help the user feel that the specimen is soft to cut.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the following, a rotary microtome and a control method for the rotary microtome will be described in detail with reference to drawings.

Figure 1:
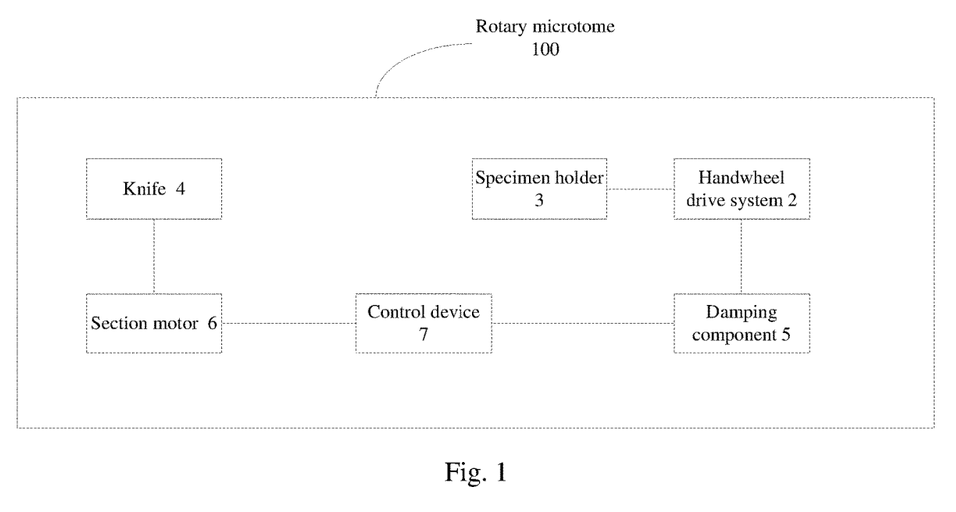
FIG. 1 is a block diagram of a rotary microtome according to an embodiment of the present disclosure.
Figure 2:
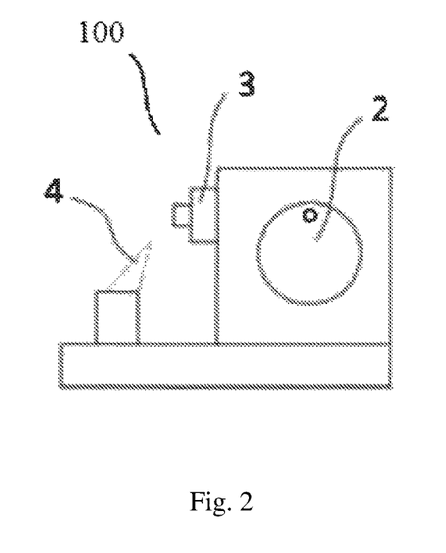
FIG. 2 is a schematic diagram illustrating a rotary microtome according to an embodiment of the present disclosure.
Figure 3:
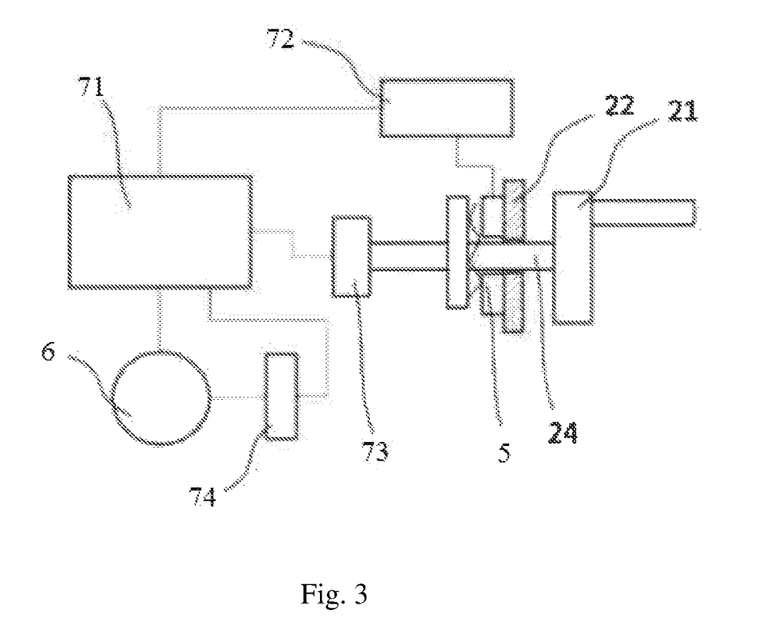
FIG. 3 is a schematic diagram illustrating details of a rotary microtome according to an embodiment of the present disclosure.

Referring to FIGS. 1-3, the rotary microtome 100 according to an embodiment of the present disclosure includes a handwheel drive system 2, a specimen holder 3, a knife 4, a damping component 5, a section motor 6 and a control device 7.

The specimen holder 3 is configured to hold a specimen to be cut.

The handwheel drive system 2 includes a handwheel 21 and a handwheel axis 24 connected to the handwheel 21. The handwheel drive system 2 is configured to receive a user operation via the handwheel 21, and to move the specimen holder 3 up and down via the handwheel axis 24 based on the user operation. In detail, the handwheel 21 and the handwheel axis 24 can be rotated by the user, and can be supported by a housing 22.

The damping component 5 is connected to the handwheel axis 24, and configured to generate damping for rotation of the handwheel axis 24.

The knife 4 is configured to cut the specimen into thin sections.

The section motor 6 is connected to the knife 4, and configured to drive the knife 4 to cut the specimen.

The control device 7 is connected to the damping component 5 and the section motor 6 respectively. The control device 7 is configured to obtain an operation parameter of the section motor 6, and to adjust the damping generated by the damping component 5 according to the operation parameter, such that the user feels a material hardness of the specimen.

In an embodiment of the present disclosure, the control device 7 includes a main controller 71 and a damping controller 72. The main controller 71 is connected to the section motor 6. The main controller 71 is configured to obtain the operation parameter of the section motor, and to generate an adjusting instruction according to the operation parameter. The damping controller 72 is connected to the damping component 5 and the main controller 71 respectively. The damping controller 72 is configured to receive the adjusting instruction from the main controller 71, and to adjust the damping generated by the damping component 5 according to the adjusting instruction.

Figure 4:
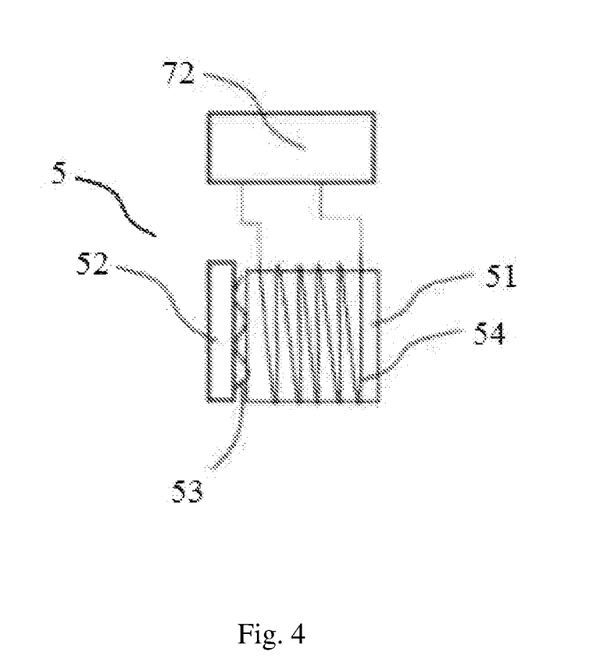
FIG. 4 is a schematic diagram illustrating a damping component according to an embodiment of the present disclosure.

In an embodiment of the present disclosure as illustrated in FIG. 4, the damping component 5 may include a fixed iron 51, a moveable iron 52 and an elastic element 53. The movable iron 52 is provided on the handwheel axis 24, and configured to move with the handwheel axis 24. The fixed iron 51 may be fixed on the housing 22. A coil 54 is around the fixed iron 51. When an electrical current is applied to the coil 54, the fixed iron 51 and the coil 54 compromise an electrical magnet, and the movable iron 52 is attracted to the fixed iron 51. The elastic element 53 is disposed between the movable iron 52 and the fixed iron 51. When the moveable iron 52 is attracted to the fixed iron 51, the elastic element 53 is compressed to generate the damping. For example, the elastic element 53 may be a spring, or the like.

When the electrical current applied to the coil 54 increases, the attractive force between the two irons increases, and the elastic element 53 is compressed more, and thus the damping increases. When the electrical current applied to the coil 54 decreases, the attractive force between the two irons decreases, and the elastic element 53 is compressed less, and thus the damping decreases. Therefore, by adjusting the electrical current applied to the coil, the generated damping can be adjusted.

In detail, the electrical current applied to the coil 54 may be adjusted in following ways.

As illustrated in FIG. 2, in an embodiment of the present disclosure, the control device 7 may further include a first encoder 73 and a second encoder 74. The first encoder 73 is connected to the handwheel axis 24, and configured to detect a rotation angle of the handwheel 21. The second encoder 74 is connected to the section motor 6, and is configured to detect a rotation angle of the section motor 6. The main controller 71 is connected to the first encoder 73 and the second encoder 74 respectively. The main controller 71 is configured to compare the rotation angle of the handwheel 21 with the rotation angle of the section motor 6, and determine whether to adjust the electrical current applied to the coil 54 according to a comparison result.

In detail, when the rotation angle of the handwheel 21 is equal to the rotation angle of the section motor 6, the main controller 71 sends a first instruction to the damping controller 72, in which the first instruction indicates keeping the electrical current of the coil 54 unchanged. The damping controller 72 keeps the electrical current of the coil 54 unchanged according to the first instruction. When the rotation angle of the handwheel 21 is bigger than the rotation angle of the section motor 6, the main controller 71 sends a second instruction to the damping controller 72, in which the second instruction indicates increasing the electrical current of the coil 54. The damping controller 72 increases the electrical current of the coil 54 according to the second instruction. When the rotation angle of the handwheel 21 is less than the rotation angle of the section motor 6, the main controller 71 sends a third instruction to the damping controller 72, in which the third instruction indicates decreasing the electrical current of the coil 54. The damping controller 72 decreases the electrical current of the coil 54 according to the third instruction.

When the angle of the section motor 6 is less than the angle of the handwheel 21, the damping controller 72 makes the damping of the damping component 5 increase. This makes the handwheel 21 harder to rotate, and help the user feel that the specimen is hard to cut. When the angle of the section motor 6 is bigger than the angle of the handwheel 21, the damping controller 72 makes the damping of the damping component 5 decrease. This makes the handwheel 21 easier to rotate, and help the user feel that the specimen is soft to cut.

In another embodiment of the present disclosure, the control device 7 may further include an electrical current detector (not shown). The electrical current detector is configured to detect an electrical current of the section motor 6 in real time. The main controller 71 is configured to obtain the electrical current detected by the electrical current detector, and to generate the adjusting instruction according to the electrical current. In at least one embodiment, the electrical current is in direct proportion to the damping generated by the damping component 5.

If the electrical current is increasing, it shows the knife 4 contacts some hard sample, and the damping component 5 will increase the damping of the handwheel 21, which helps the user feel that the material is hard. If the electrical current is decreasing, it shows the knife 4 contacts some soft sample or no sample (on the way back to the start/home position), and the damping component 5 will decrease the damping of the handwheel 21, which helps the user feel that the material is soft. Thus, the damping can be adjusted at any time.

In practice, the current of the section motor 6 when the knife 4 is not in contact with any sample can be measured first and stored as a basic setting. Additionally, this current of "no sample contact" can be used as a start signal for controlling the damping component 5 to generate the damping. When the knife 4 does not contact any sample, the damping is very small, and the electrical current of the section motor is very small, which is stored as an initial value. When the user rotates the handwheels 21, the damping component 5 is controlled to generate a small damping according to the stored current value, and then the damping generated by the damping component 5 is adjusted according to the current value detected in real time.

During working, the damping controller 72 can be switched on or off by the user. The break force of the damping component 5 is adjustable by the user.

With the rotary microtome according to embodiments of the present disclosure, the damping generated by the damping component and transported to the handwheel is adjusted according to operation parameter of the section motor, such that the user can feel the material hardness of the specimen, thus ensuring a better cutting operation.

Embodiments of the present disclosure further provide a control method for the above rotary microtome.

Figure 5:
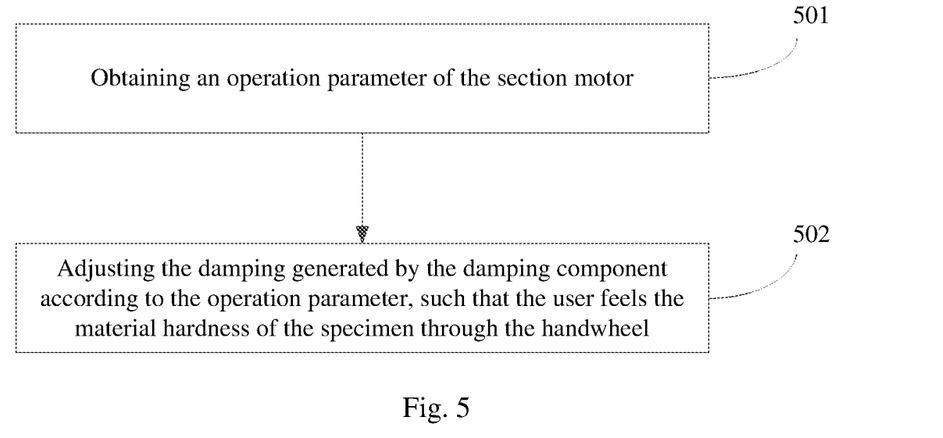
FIG. 5 is a flow chart of a control method for a rotary microtome according to an embodiment of the present disclosure.

FIG. 5 is a flow chart of a control method for a rotary microtome according to an embodiment of the present disclosure. As illustrated in FIG. 5, the control method includes followings.

At block 501, the operation parameter of the section motor is obtained.

At block 502, the damping generated by the damping component is adjusted according to the operation parameter, such that the user feels the material hardness of the specimen through the handwheel.

In an embodiment of the present disclosure, an adjusting instruction is generated according to the operation parameter, and the electrical current applied to the coil is adjusted according to the adjusting instruction, so as to adjust the damping generated by the damping component.

In detail, in an embodiment of the present disclosure, an electrical current of the section motor is detected in real time. The adjusting instruction is generated according to the electrical current. In at least one embodiment, the electrical current is in direct proportion to the damping generated by the damping component.

If the electrical current is increasing, it shows the knife contacts some hard sample, and the damping component will increase the damping of the handwheel, which helps the user feel that the material is hard. If the electrical current is decreasing, it shows the knife contacts some soft sample or no sample (on the way back to the start/home position), and the damping component will decrease the damping of the handwheel, which helps the user feel that the material is soft.

In another embodiment, a rotation angle of the handwheel and a rotation angle of the section motor are obtained. The rotation angle of the handwheel is compared with the rotation angle of the section motor to obtain a comparison result. The electrical current applied to the coil is adjusted according to the comparison result, so as to adjust the damping generated by the damping component.

In detail, the electrical current applied to the coil is kept unchanged when the rotation angle of the handwheel is equal to the rotation angle of the section motor. The electrical current applied to the coil is increased when the rotation angle of the handwheel is bigger than the rotation angle of the section motor. The electrical current applied to the coil is decreased when the rotation angle of the handwheel is less than the rotation angle of the section motor.

Accordingly, when the angle of the section motor is less than the angle of the handwheel, the damping controller makes the damping of the damping component increase. This makes the handwheel harder to rotate, and help the user feel that the specimen is hard to cut. When the angle of the section motor is bigger than the angle of the handwheel, the damping controller makes the damping of the damping component decrease. This makes the handwheel easier to rotate, and help the user feel that the specimen is soft to cut.

With respect to specific implementation of the above method, reference can be made to the above-described embodiments of the rotary microtome, which will not be elaborated herein.

It is to be understood that, in the description, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the present utility model, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present utility model. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present utility model. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Although explanatory embodiments have been shown and described, it would be appreciated by those skilled in the art that the above embodiments cannot be construed to limit the present utility model, and changes, alternatives, and modifications can be made in the embodiments without departing from spirit, principles and scope of the present utility model.

What is claimed is:

1. A rotary microtome, comprising:
    a specimen holder, configured to hold a specimen to be cut;
    a handwheel drive system, comprising a handwheel and a handwheel axis connected to the handwheel, and configured to receive a user operation via the handwheel and to move the specimen holder up and down via the handwheel axis based on the user operation;
    a damping component, connected to the handwheel axis, and configured to generate damping for rotation of the handwheel axis;
    a knife;
    a section motor, connected to the knife and configured to drive the knife to cut the specimen; and
    a control device, connected to the damping component and the section motor respectively, and configured to obtain an operation parameter of the section motor, and to adjust the damping generated by the damping component according to the operation parameter.

2. The rotary microtome according to claim 1, wherein the damping component comprises:
    a movable iron, provided on the handwheel axis and configured to move with the handwheel axis;
    a fixed iron, wherein a coil is around the fixed iron, and when an electrical current is applied to the coil, an electromagnetic field is generated by the fixed iron and the coil, and the moveable iron is attracted to the fixed iron;
    an elastic element, disposed between the movable iron and the fixed iron, wherein when the moveable iron is attracted to the fixed iron, the elastic element is compressed to generate the damping.

3. The rotary microtome according to claim 2, wherein the control device is configured to adjust the damping by adjusting the electrical current applied to the coil.

4. The rotary microtome according to claim 2, wherein the control device comprises:
    a main controller, configured to obtain the operation parameter of the section motor, and to generate an adjusting instruction according to the operation parameter; and
    a damping controller, configured to receive the adjusting instruction, and to adjust the electrical current applied to the coil according to the adjusting instruction.

5. The rotary microtome according to claim 4, wherein control device further comprises:
    an electrical current detector, configured to detect an electrical current of the section motor in real time,
    wherein the main controller is configured to obtain the electrical current detected by the electrical current detector, and generate the adjusting instruction according to the electrical current.

6. The rotary microtome according to claim 5, wherein the electrical current is in direct proportion to the damping generated by the damping component.

7. The rotary microtome according to claim 4, wherein the control device further comprises:
    a first encoder, connected to the handwheel axis, and configured to detect a rotation angle of the handwheel; and
    a second encoder, configured to detect a rotation angle of the section motor,
    wherein the main controller is connected to the first encoder and the second encoder respectively, and configured to compare the rotation angle of the handwheel with the rotation angle of the section motor, and determine whether to adjust the electrical current applied to the coil according to a comparison result.

8. The rotary microtome according to claim 7, wherein, the main controller is configured to:
    instruct the damping controller to keep the electrical current applied to the coil unchanged when the rotation angle of the handwheel is equal to the rotation angle of the section motor;
    instruct the damping controller to increase the electrical current applied to the coil when the rotation angle of the handwheel is bigger than the rotation angle of the section motor; and
    instruct the damping controller to decrease the electrical current applied to the coil when the rotation angle of the handwheel is less than the rotation angle of the section motor.

9. A control method for the rotary microtome according to claim 1, comprising:
    obtaining an operation parameter of the section motor; and
    adjusting the damping generated by the damping component according to the operation parameter.

10. The control method according to claim 9, wherein adjusting the damping generated by the damping component according to the operation parameter comprises:
    generating an adjusting instruction according to the operation parameter; and
    adjusting the electrical current applied to the coil according to the adjusting instruction, so as to adjust the damping generated by the damping component.

11. The control method according to claim 10, wherein generating an adjusting instruction according to the operation parameter comprises:
    detecting an electrical current of the section motor in real time; and
    generating the adjusting instruction according to the electrical current.

12. The control method according to claim 11, wherein the electrical current is in direct proportion to the damping generated by the damping component.

13. The control method according to claim 9, wherein adjusting the damping generated by the damping component according to the operation parameter comprises:
    detecting a rotation angle of the handwheel and a rotation angle of the section motor;
    comparing the rotation angle of the handwheel with the rotation angle of the section motor to obtain a comparison result; and
    adjusting the electrical current applied to the coil according to the comparison result, so as to adjust the damping generated by the damping component.

14. The control method according to claim 13, wherein adjusting the electrical current applied to the coil according to the comparison result comprises:
- keeping the electrical current applied to the coil unchanged when the rotation angle of the handwheel is equal to the rotation angle of the section motor;
- increasing the electrical current applied to the coil when the rotation angle of the handwheel is bigger than the rotation angle of the section motor; and
- decreasing the electrical current applied to the coil when the rotation angle of the handwheel is less than the rotation angle of the section motor.

* * * * *

UNITED STATES PATENT AND TRADEMARK OFFICE
CERTIFICATE OF CORRECTION

| | | |
|---|---|---|
| PATENT NO. | : 11,209,340 B2 | |
| APPLICATION NO. | : 16/626182 | |
| DATED | : December 28, 2021 | |
| INVENTOR(S) | : Fan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 223 days.

Signed and Sealed this
Sixteenth Day of May, 2023

*Katherine Kelly Vidal*

Katherine Kelly Vidal
*Director of the United States Patent and Trademark Office*